United States Patent [19]

Smith et al.

[11] 4,455,733
[45] Jun. 26, 1984

[54] FURNACE COOLING ELEMENTS AND METHOD OF FORMING FURNACE COOLING ELEMENTS

[75] Inventors: Barry W. Smith, Keiraville; Anthony J. Hudson, Dapto, both of Australia

[73] Assignee: The Broken Hill Proprietary Company Limited, Melbourne, Australia

[21] Appl. No.: 339,438

[22] PCT Filed: May 8, 1981

[86] PCT No.: PCT/AU81/00052
§ 371 Date: Dec. 29, 1981
§ 102(e) Date: Dec. 29, 1981

[87] PCT Pub. No.: WO81/03221
PCT Pub. Date: Nov. 12, 1981

[30] Foreign Application Priority Data

May 8, 1980 [AU] Australia .................... PE3460

[51] Int. Cl.³ ............ B23P 17/00; B21D 22/10; C21B 7/10
[52] U.S. Cl. .................... 29/421 R; 72/62; 266/193
[58] Field of Search ............ 266/193; 165/70, 171, 165/180, 168, 134, 81; 29/421 R, 421 E; 72/60, 61, 62

[56] References Cited

U.S. PATENT DOCUMENTS

| | | | |
|---|---|---|---|
| 3,706,343 | 12/1972 | Seiga et al. | 165/70 |
| 3,863,327 | 2/1975 | Legate | 29/470.1 |
| 4,028,789 | 6/1977 | Loch | 29/421 E |
| 4,187,709 | 2/1980 | Legate et al. | 72/62 |

*Primary Examiner*—Howard N. Goldberg
*Assistant Examiner*—S. E. Nichols
*Attorney, Agent, or Firm*—Murray, Whisenhunt and Ferguson

[57] ABSTRACT

There is disclosed a method of forming a furnace cooling element involving casting a metal block or plate (10) around one or more elongated metal tubes (11) which have a protective coating applied thereto, and thereafter the, or each, metal tube (11) is explosively expanded by an explosive charge (12) closer to the surrounding material of the metal plate (10). Also disclosed is a method in which the protective coating on the metal tube is replaced by a full length external shroud tube (21) to increase the thermal efficiency of the cooling element, the inner metal cooling tube (20) is explosively expanded by an explosive charge (23) closer to the surrounding shroud tube (21) prior to casting a metal plate or block (28) around the tube combination (20, 21) to minimize the gap (22) between the outside wall of the metal cooling tube (20) and the inside wall of the metal protective shroud tube (21). Following casting the metal plate or block (28), the metal cooling tube (20) is again explosively expanded closer to the protective shroud tube (21) by a further explosive charge (23').

12 Claims, 4 Drawing Figures

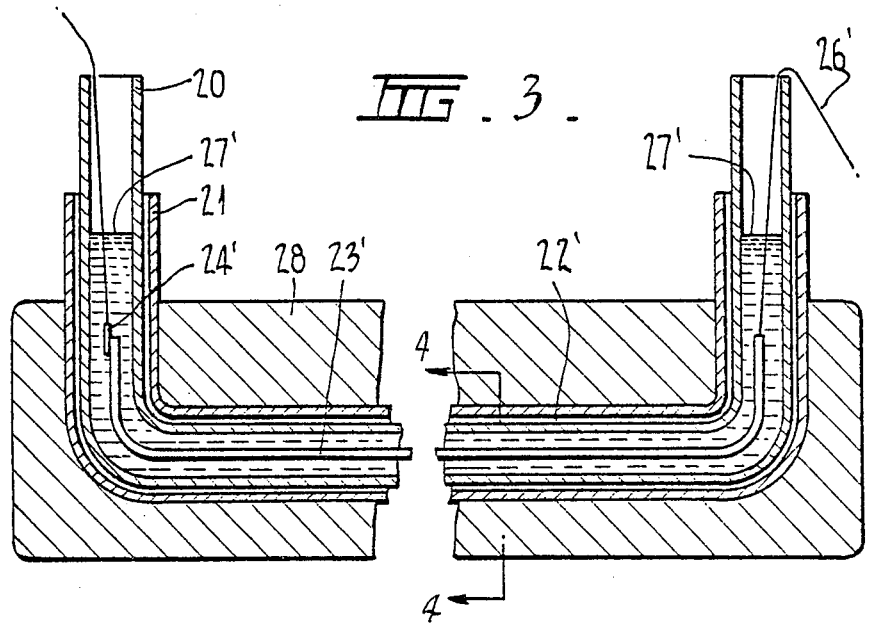
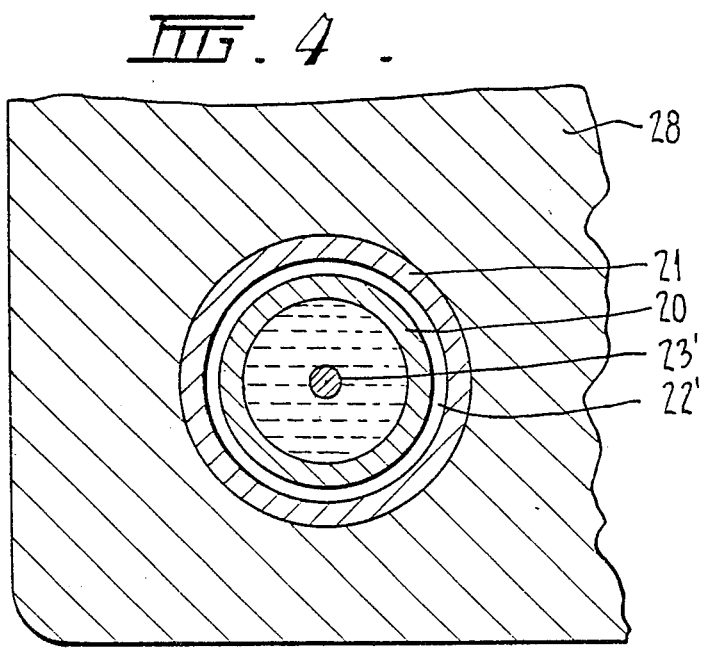

FURNACE COOLING ELEMENTS AND METHOD OF FORMING FURNACE COOLING ELEMENTS

TECHNICAL FIELD

The present invention relates to furnace cooling elements, and also relates to a method of forming cooling elements in general to improve their thermal efficiency.

BAKCGROUND ART

Furnace cooling elements are utilised for cooling the refractory lining and shell of a high temperature furnace to prevent excessive heating and cracking of the external shell of the furnace and so extend the operating campaign life of the furnace.

The cooling elements take the form of cast metal plates or blocks with elongated metal cooling tubes cast therein and through which coolant is passed. More particularly, traditionally cast iron plates and steel tubes are used blast furnaces and electric furnaces and are called staves.

In producing the cooling elements, the metal tubes may be protectively coated to prevent harmful metallurgical bonding. Such protective coatings are conventionally provided by thermosprayed alumina, which is a costly requirement.

It is an object of a first aspect of the invention to provide a furnace cooling element construction in which the necessity for such costly protective coatings is dispensed with, whilst at the same time the thermal efficiency of the element is improved.

Furthermore, during the formation of conventional furnace cooling elements, a small gap is formed, as a result of casting, between the outside of the metal cooling tube and the surrounding material of the cast metal plate or block.

We have also discovered that the size of the gap has a direct and significant effect on the heat exchange between the components due to the insulating effect of the gap.

It is therefore an object of a second aspect of the present invention to overcome this provlem by providing a controlled method of reforming the metal tubes of the cooling elements in which the amount of gap is significantly reduced and the thermal efficiency of the cooling element is consequently improved.

DISCLOSURE OF THE INVENTION

According to the first aspect of the invention, there is envisaged a method of forming a furnace cooling element, including the steps of positioning an external shroud member around an elongate metal cooling tube over a substantial length thereof, and thereafter casting a metal body around the combination of the inner metal cooling tube and its surrounding shroud member.

According to the second aspect of the invention, there is envisaged a method of forming at least part of a furnace cooling element, including the step of sharply increasing the pressure of a fluid within an inner component thereof to expand said component closer to a surrounding outer component.

Preferably the pressure of the fluid in said inner component is sharply increased by detonating an explosive charge in the fluid in said component, or in communication with the fluid in said component, although other means of sharply increasing fluid pressure, such as the application of percussive forces to elements acting on said fluid to sharply increase the pressure within said fluid, may be utilised.

In one form of this second aspect of the invention, as applied to a basic furnace cooling element, the metal body is metal plate or block which is cast around one or more elongated metal tubes to form a cooling element and thereafter the metal tube is explosively expanded closer to the surrounding material of the metal plate. It has been found that the reduction of the gap between the, or each, tube and metal plate significantly improves the thermal efficiency of the cooling element. The, or each, metal tube may have a protective coating applied thereto.

In another form of this second aspect of the invention, the protective coating on the metal tube is replaced by an external shroud, according to the first aspect of the invention, and the inner metal cooling tube is explosively expanded closer to the surrounding shroud prior to casting to minimise the gap between the outside wall of the metal cooling tube and the inside wall of the protective shroud. Alternatively, or in addition to, the metal cooling tube may again be explosively expanded closer to the protective shroud after casting.

Expansion may be achieved by exploding a single relatively large charge of explosive, or alternatively, a series of repeated explosions using smaller explosive charges may be utilised to reduce the possibility of cracking or other damage to the cooling tube or surrounding metal body of the cooling element.

The invention also envisages a furnace cooling element produced according to any one of the methods hereinabove defined.

BRIEF DESCRIPTION OF THE DRAWINGS

Preferred embodiments of both aspects of the invention will now be described with reference to the accompanying drawings in which:

FIG. 3 is a cross-sectional view of a stave incorporating a continuous shroud pipe prior to explosive treatment to minimise the contraction gap resulting after casting.

FIG. 4 is a schematic representation of a section taken transversely across one of the steel cooling tubes in a stave that has been protected by a continuous shroud pipe, and prior to expansion by an explosive charge.

BEST MODES FOR CARRYING OUT THE INVENTION

Figure 1:
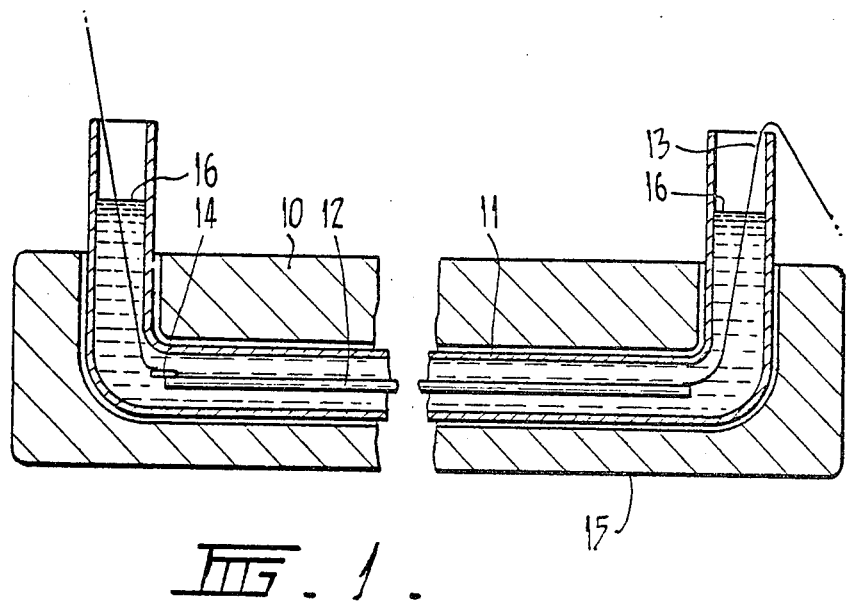
FIG. 1 is a longitudinal cross-sectional view of a stave assembly (furnace cooling element) showing a steel tube cast within a cast iron plate preparatory to expansion by an explosive charge.

Referring to FIG. 1 of the drawings, in accordance with one preferred embodiment of the method of one aspect of the invention, and as an example of the effectiveness thereof, a stave, comprising a cast iron plate or block containing four steel cooling tubes 11 (only one of which is shown) and protected by a coating of thermosprayed sprayed alumina, was, after casting of the plate or block 10, explosively expanded to improve the thermal efficiency of the stave.

An explosive charge weight of one strand of 20 gm$^{-1}$ of instantaneous detonating fuse (generally indicated as 12) was attached at one end to a pull cord 13 with an electric detonator 14 attached to the other end. The pull cord was used to locate the explosive charge in the section of steel tube 11 parallel to the stave hot face 15. The steel tube was filled with water to the level indicated at 16. Each steel tube 11 within the stave was similarly prepared. The explosive charges were initiated at separate time intervals to avoid undue stress on the stave iron.

The explosively treated stave was then placed in a test furnace together with a stave that had been manufactured by the same method, except for the explosive expansion treatment, to compare the heat extraction rate of each stave. The results of the furnace trial indicated that a significant improvement in the heat extracted from the explosively treated stave had been achieved as shown in the following Table 1. It will be observed from Table 1 that the exposed hot face temperature of the explosively treated stave had been lowered by between 80° C. and 100° C. compared to the hot face temperature of the standard trial stave under the same furnace conditions.

TABLE 1

| Furnace | Temperature of Stave | | |
|---|---|---|---|
| Flue Gas Temperature °C. | Hot Face Standard | °C. Exploded | Difference |
| 850 | 380 | 290 | −90 |
| 900 | 435 | 335 | −100 |
| 950 | 490 | 390 | −100 |
| 1000 | 540 | 640 | −100 |
| 1050 | 580 | 490 | −90 |
| 1100 | 640 | 560 | −80 |

Following the furnace trial it was observed that the explosive expansion treatment of the trial stave had resulted in extremely fine intermittent surface cracking of the stave iron. The cracking only occurred along the flat stave sides at one end where the thickness of cast iron surrounding the steel tubes was a minimum. Sectioning of the stave revealed that the depth of cracking was in the order of 6 mm deep and that cracking had ceased when the thickness of stave iron 10 covering the steel tube 11 exceeded 61 mm depth. Examination of additional explosively expanded staves revealed that the strength and thickness of cast iron 10 surrounding the steel tube 11 will determine if surface cracking would occur. Table 2 shows this effect when an explosive charge weight of 20 gm$^{-1}$ is utilised.

TABLE 2

| Explosive Charge Weight of 20 gm$^{-1}$ | | |
|---|---|---|
| Cast Iron Strength MPa | Thickness of Cast Iron Covering Steel Tube | Type of Surface Cracking |
| 192 | 61 mm | Extremely fine and intermittent |
| 186 | 60 mm | Fine and Intermittent |
| 212 | 60 mm | NIL |

It will be observed from Table 2 that the critical thickness of cast iron of 200 MPa tensile strength would be approximately 60 mm. To avoid surface cracking a design thickness of 70 mm of cast iron of 200 MPa strength covering the steel tubes would be required for a 20 gm$^{-1}$ explosive charge. Using known transverse rupture stress formula other design thickness limits may be set. For example a stave iron of 150 MPa strength has a calculated critical thickness of 69 mm, the addition of a 10 mm safety factor would give a design thickness of 79 mm for a stave requiring explosive expansion by a 20 gm$^{-1}$ explosive charge.

A preferred form of another aspect of the invention, which has been developed to completely eliminate the high cost of alumina spraying the steel tubes, cost of quality control etc and the resistance of the protective alumina coating to heat transfer, will now be described with reference to FIGS. 2 to 4 of the drawings.

In a place of the alumina coating an external continuous steel pipe 21 (shroud pipe) of 5 mm minimum wall thickness is placed over a steel cooling tube 20 and a close fit between the outside of the cooling tube 20 and the inside of the protective continuous shroud pipe 21 is provided. The continuous shroud pipe 21 serves two purposes, the first is to absorb all carbon diffusion from the cast iron during casting, this normally occurs within the outside 3 mm of the protective pipe wall thickness. The second purpose is to promote metallurgical bonding of the cast iron to the continuous shroud pipe 21 to give good heat transfer and to retain sections of stave iron that would normally be lost due to thermal fatigue cracking towards the end of the stave life.

Figure 2:
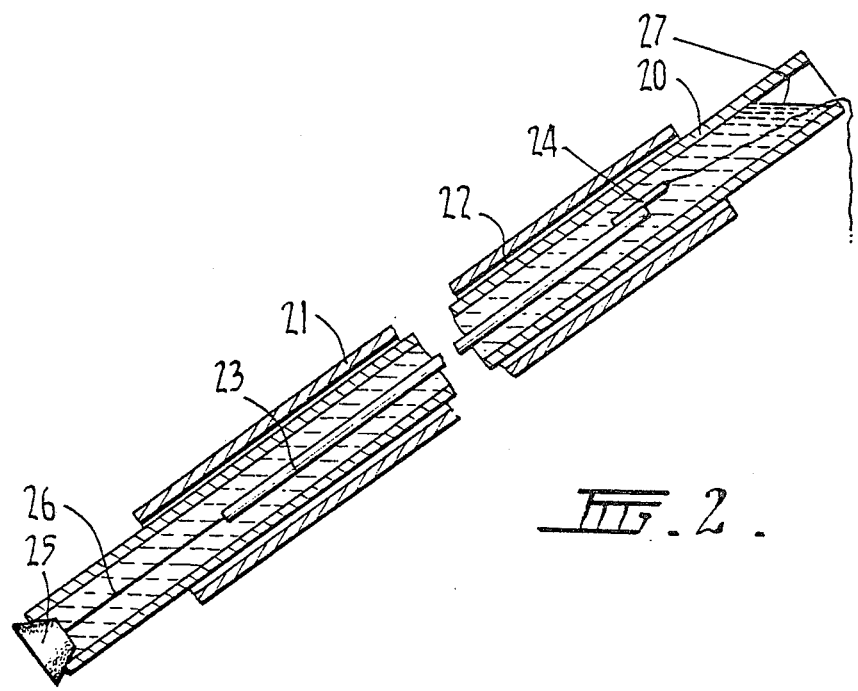
FIG. 2 is a cross-sectional view of an arrangement incorporating a continuous shroud pipe, to protect the inner steel cooling tube against harmful carburisation, and shows the arrangement prior to expansion of the inner tube by an explosive charge.

FIG. 2 of the drawings also shows, a method of reducing the "fit-up" gap between the steel cooling tube 20 and continuous shroud pipe 21 by explosive expansion, in accordance with a preferred form of the other aspect of the invention. Prior to bending the steel tubes the outside surface of the steel cooling tube 20 is cleaned and placed inside the continuous shroud pipe 21. The gap 22 between the concentric tubes may then be reduced by detonating a small linear explosive charge of 10 gm$^{-1}$ of instantaneous detonating fuse 23. The explosive charge with detonator 24 attached at one end is attached at the other end to a rubber plug 25 by a tie cord 26 and the inside of the steel cooling tube 20 is then filled with water to the level indicated at 27. Depending on the quality and strength of the internal steel cooling tube 20 an explosive charge of greater weight may be required to give a tighter fit. Also the outside surface of the continuous shroud pipe 21 may require support to prevent expansion of this pipe or possible splitting of the steel cooling tube 20.

Following bending of the combination of tubes 20 and 21 to shape, to suit the stave mould, the tubes are cast within the stave body 28. Following casting, a small shrinkage gap results between the inside steel cooling tube 20 and the external shroud pipe 21 due to differential contraction caused by the bonding of the shroud pipe to the stave body, thereby limiting the contraction of the shroud pipe to the lesser contraction of the cast iron stave body. This gap can be eliminated by a further explosive expansion treatment, resulting in excellent heat transfer between the stave hot face and the cooling medium within the steel cooling tubes.

Referring to FIG. 3 the arrangement of one of the continuous shroud pipes 21, protecting the cooling tube 20, can be seen within the cast iron stave body 28, prior to explosive expansion. A cross-sectional view of one of the protected tubes 20 is depicted in FIG. 4 showing the metallurgical bonding of the continuous shroud pipe 21 to the cast iron stave 28, the contraction gap between the two tubes 20 and 21 and the approximate location of the explosive charge within the water filled steel cooling tube 20 prior to explosive expansion. In FIGS. 3 and 4 the detonating fuse is designated by 23', the detonator by 24', the pull cord by 26', the water level by 27', and the remaining gap which is to be further explosively reduced is designated by 22'.

The amount of explosive charge required for successful explosive treatment following casting of the stave depends on the following factors.

A. The average width of the gap between the steel cooling tube 20 and the continuous shroud pipe 21.
B. The diameter and wall thickness of the steel cooling tube 20.
C. The strength of the stave cast iron 28.
D. The minimum thickness of cast iron 28 surrounding the continuous shroud pipe 21.

For example an average gap between tubes 20 and 21 of 0.5 mm with a steel cooling tube 20 of 65 mm diameter and 6 mm wall thickness would require an explosive charge weight of 20 gm$^{-1}$ of instantaneous detonating fuse (V.O.D. 7000 ms$^{-1}$). This could safely be carried out for a stave of 200 MPa tensile strength having a minimum coverage of 70 mm of cast iron 28 surrounding the continuous shroud pipe 21. For staves of lower strength and/or reduced cast iron coverage of the continuous shroud pipe 21, multiple applications of an explosive charge of lower charge weight may be used to achieve the desired expansion of the steel cooling tube 20.

The lower hot face operating temperatures achieved with the improved heat transfer efficiency of the furnace cooling elements of the present invention has the effect of prolonging the service life of the furnace cooling elements due to a reduction in the incidence of erosion and thermal fatigue cracking.

We claim:

1. A method of forming a furnace cooling element, including the steps of positioning an external shroud member around an elongate metal cooling tube over a substantial length thereof; sharply increasing the pressure of a fluid within said inner metal cooling tube to expand said tube closer to said shroud member; casting a metal body around the combination of the inner metal cooling tube and its surrounding shroud member; and thereafter again sharply increasing the pressure of a fluid within said inner metal cooling tube to expand said inner metal cooling tube closer to said surrounding shroud member; and all without any welding occurring between said inner metal cooling tube and said shroud member.

2. The method as claimed in claim 1, wherein the external shroud member is a metal tube positioned around said metal cooling tube.

3. The method as claimed in claim 1, wherein the pressure of the fluid within said metal cooling tube is sharply increased by detonating an explosive charge in the fluid within the tube, or in communication with the fluid within the tube.

4. The method as claimed in claim 3, wherein said expansion is achieved by detonating a single charge of explosive.

5. The method as claimed in claim 3, wherein said expansion is achieved by detonating a series of charges of explosive.

6. The method as claimed in claim 1, wherein said fluid in the tube is a liquid at least partially filling said tube.

7. A method of forming a furnace cooling element, including the steps of positioning an external shroud member around an elongate metal cooling tube over a substantial length thereof; sharply increasing the pressure of a fluid within said inner metal cooling tube to expand said tube closer to said shroud member; casting a metal body aroun the combination of the inner metal cooling tube and its surrounding shroud member; and thereafter again sharply increasing the pressure of a fluid within said inner metal cooling tube to expand said inner metal cooling tube closer to said surrounding shroud member.

8. The method as claimed in claim 7, wherein the external shroud member is a metal tube positioned around said metal cooling tube.

9. The method as claimed in claim 7, wherein the pressure of the fluid within said metal cooling tube is sharply increased by detonating an explosive charge in the fluid within the tube, or in communication with the fluid within the tube.

10. The method as claimed in claim 9, wherein said expansion is achieved by detonating a single charge of explosive.

11. The method as claimed in claim 9, wherein said expansion is achieved by detonating a series of charges of explosive.

12. The method as claimed in claim 7, wherein said fluid in the tube is a liquid at least partially filling said tube.

* * * * *

UNITED STATES PATENT AND TRADEMARK OFFICE
CERTIFICATE OF CORRECTION

PATENT NO. : 4,455,733

DATED : June 26, 1984

INVENTOR(S) : BARRY WILLIAM SMITH et al

It is certified that error appears in the above-identified patent and that said Letters Patent is hereby corrected as shown below:

Column 1, line 21, after "used" insert --in--;
            line 43, change "provlem" to --problem--.

Column 2, line 64, delete "sprayed".

Column 6, line 24, change "aroun" to --around--.

Signed and Sealed this

Ninth Day of April 1985

[SEAL]

Attest:

DONALD J. QUIGG

Attesting Officer

Acting Commissioner of Patents and Trademarks